United States Patent [19]

Brixy

[11] 3,890,841

[45] June 24, 1975

[54] THERMAL NOISE MEASUREMENT SYSTEM

[75] Inventor: Heinz Brixy, Julich, Germany

[73] Assignee: Kernforschungsanlage Julich GmbH, Julich, Germany

[22] Filed: June 13, 1973

[21] Appl. No.: 369,733

[30] Foreign Application Priority Data
June 15, 1972 Germany............................ 22291403

[52] U.S. Cl. ............................... 73/359; 73/362 AR
[51] Int. Cl. ............................................. G01k 7/30
[58] Field of Search..... 73/359, 362 AR; 235/193.5, 235/194

[56] References Cited
UNITED STATES PATENTS

| | | | |
|---|---|---|---|
| 2,728,832 | 12/1955 | Hoffman ......................... | 73/362 AR |
| 2,914,594 | 11/1959 | Kanne................................. | 73/359 |
| 3,818,761 | 6/1974 | Brixy et al. ............................ | 73/359 |

Primary Examiner—S. Clement Swisher
Assistant Examiner—Denis E. Corr
Attorney, Agent, or Firm—Karl F. Ross; Herbert Dubno

[57] ABSTRACT

A system for measuring temperatures using the thermal-noise electrical output of a conductive element in which a reference resistor and the conductive element are connected by a sampling switch arrangement to two amplifiers provided with filters whose band width or characteristic pass frequency corresponds to the noice-voltage frequency. The outputs of the latter are applied to a multiplier or squaring circuit and the latter supplies an analog or d-c signal to the output stage via a commutating switch synchronized with the sampleing switch. The switch arrangement is such that both amplifier-filter paths are either simultaneously connected to the reference resistor or with the measuring resistor.

7 Claims, 9 Drawing Figures

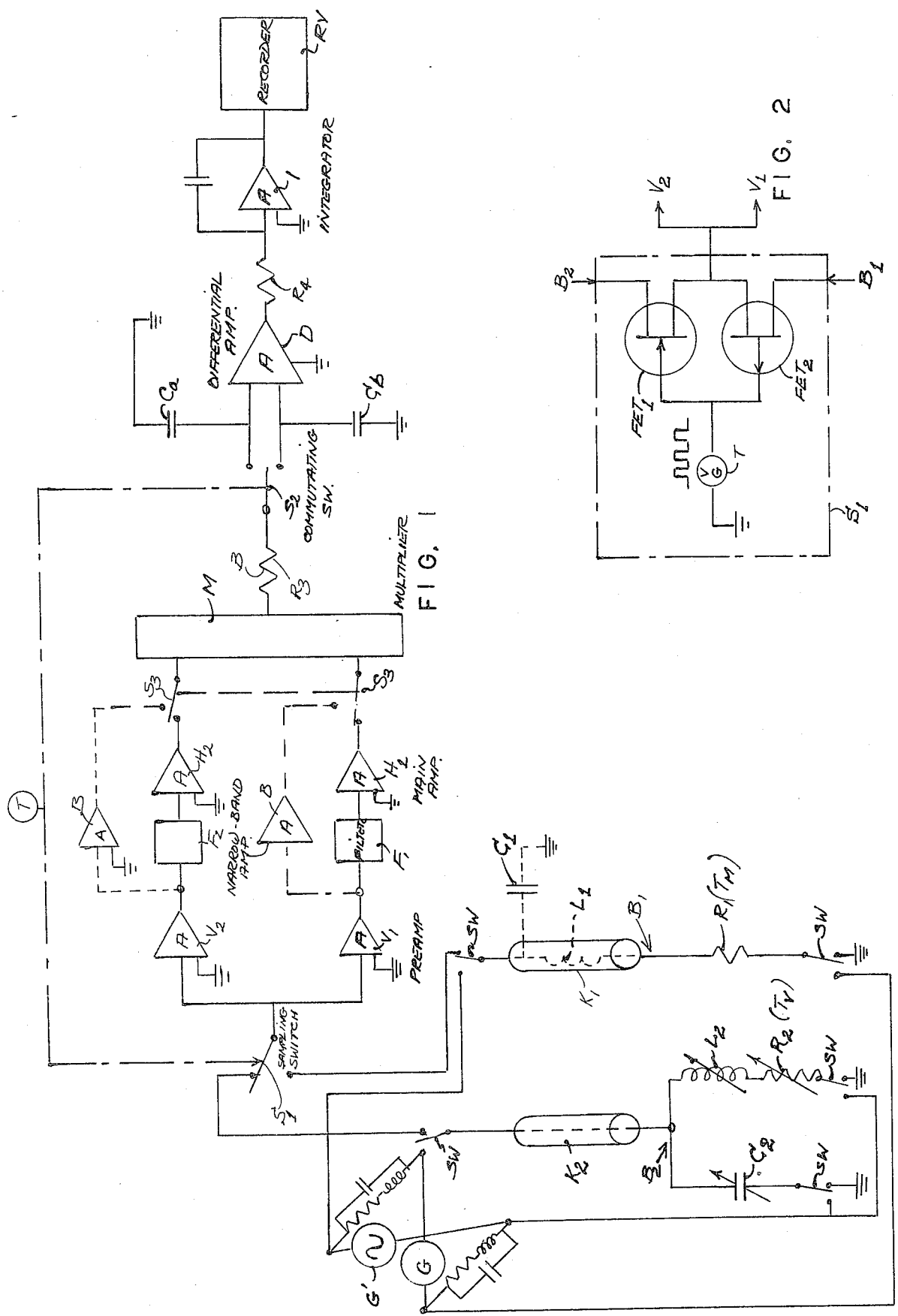

PATENTED JUN 24 1975  SHEET 3  3,890,841

THERMAL NOISE MEASUREMENT SYSTEM

CROSS-REFERENCE TO RELATED APPLICATIONS

This application is related to the commonly assigned copending applications Ser. No. 238,833 (now U.S. Pat. No. 3,818,761) and Ser. No. 238,834, both filed 28 Mar. 1972.

FIELD OF THE INVENTION

The present invention relates to a system for measuring temperatures using the thermally-generated noise voltage produced in a metallic conductor (measuring resistor) as a function of temperature and, more particularly, to a thermal-noise temperature-measurement system.

BACKGROUND OF THE INVENTION

A number of temperature-measuring systems have been proposed heretofore wherein thermal/electric transducers are employed. Such systems make use of temperature-related electrical parameters of various devices. For example, in a thermocouple the metallic junction of two dissimilar metals produces an output in the millivolt range when subjected to a temperature differential. Thermoresistive devices, on the ohter hand, become more or less conductive in accordance with the ambient temperature. There exist also systems in which thermoemission is detected in order to indicate temperature conditions or changes.

While the foregoing is not an exhaustive discussion of the various electrical parameters which have been used for temperature measurement, they have been described to distinguish between such systems and systems in which a metallic strand, wire or film generates an electrical output by thermal agitation of electrical charges within the conductor. The output is a "noise" voltage and is produced in an electrical conductor by such thermal agitation. Thermal noise, also known as Johnson noise, can be produced in a conductor even at temperatures approaching 0° Kelvin (°K) and is particularly suitable for the measurement of temperatures in the range of 0° to several hundred °K. The available thermal-noise power is proportional to the absolute temperature over the frequency bandwidth over which the noise is measured. With a fixed bandwidth, the available thermal noise power can be measured in terms of the noise voltage and is proportional to absolute temperature. The theory of such systems and various circuits using same are described in U.S. Pat. Nos. 2,710,899, 2,728,835, 2,768,266 and 2,884,786.

As already indicated, various temperature/electrical transducers are known for the measurement of temperatures in addition to the noise-voltage sensors mentioned above. In prior-art systems using sensors of the latter type, practical limitations have precluded widespread use. The systems have been prone to failure and frequency give an erroneous temperature measurement. In the earlier systems using such thermally sensitive elements as bimetallic switching devices, resistance thermometers, thermistors or pyrometers, various problems have been encountered. Firstly, the sensing element has only a limited range of operability, i.e. it can be used only for a narrow temperature range. Secondly, many of the prior-art elements cannot be readily disposed at locations where temperature sensing is required. For example, pyrometers cannot effectively be incorporated in a wall without an appropriate window; resistance elements are sensitive to high pressure, intensive radiation (e.g. as may develop in a nuclear-reactor core), and to high temperature in the range of several 1000° K. In general they have insufficient accuracy in the range of temperatures slightly above 0° K to 3000° K.

Conventional thermal-noise temperature-measuring systems also have some of these drawbacks and, further, may be ineffective since the high gains required in amplifying the thermal-noise signal also multiply the inherent noise of the amplifier path.

OBJECTS OF THE INVENTION

It is, therefore, an important object of the present invention to provide a temperature-measurement system which may be used within a relatively wide temperature spectrum (i.e. from somewhat above 0° K to about 3000° K) with high accuracy and at relatively low cost.

It is another object of the invention to provide a temperature-measurement system which is less sensitive to enviromental influences than prior-art devices.

More specifically, it is an object of the present invention to provide a temperature-measurement system which is less sensitive to the particular atmosphere in which the sensing element is disposed, is substantially unaffected by radiation of the character described and is substantially uninfluenced by pressure.

Yet another object of the invention is to provide a temperature-measuring system which is independent of the material from which the sensor is constituted and its mechanical and thermal treatments.

A more general object of the invention is to provide a highly versatile temperature-measurement system which avoids the aforedescribed difficulties and provides, at low cost, a highly accurate indication of temperature, free from external influences and within a relatively wide temperature range.

SUMMARY OF THE INVENTION

These objects and others which will become apparent hereinafter are attained, in accordance with the present invention, in a noise-voltage temperature-measuring system comprising a noise-voltage temperature sensor, a preamplifier circuit connected to this sensor, a multiplier for forming an algebraic product of the amplified output of the sensor and a reference signal, and an output network including an amplifier arrangement for feeding a temperature indicator or display circuit. According to the invention, the reference signal is generated by a reference resistor. A sampling gate or switch arrangement alternately resistor. A sampling gate or switch arrangement alternately applies the outputs of the measuring resistor and the reference resistor to the multiplier as alternately derived from the respective amplifier chains.

According to the present invention, therefore, the system comprises a noise-voltage measuring resistor and a reference resistor alternately connected through preamplifier branches to a sampling gate or switch which is synchronized with an output sampling gate or switch for commutating the output of the multiplier to two inputs having respective capacitors (signal-storing condensers) of a differential amplifier which may be connected through an analog integrating amplifier, operating also as a signal inverter, and supplying the output or temperature-indicating circuit. This circuit has been found to be highly desirable because the intrinsic noise of the amplifier branches is canceled or so reduced that the measurement precision is markedly increased.

The temperature-measuring system of the present invention uses the principles enunciated earlier whereby the statistical distribution of electrical charges in an electrical conductor, i.e. the thermal noise, is measured in the form of minute voltage fluctuations measured across the conductor (measuring resistor) and is directly proportional to the absolute temperature thereof in accordance with the NYQUIST formula:

$$\overline{E^2} = 4k\, R_c(Z)T\Delta f,$$

where $E$ is the measured voltage (noise voltage) signal, $\overline{E^2}$ is the mean-square voltage fluctuation and is essentially a d-c amplitude, $\Delta f$ is the frequency band over which the fluctuations are measured, $k$ is the Boltzmann gas constant, $R_c(Z)$ is the real part of the complex impedance of the measuring resistor, and $T$ is the absolute temperature thereof. This relation can be transposed to:

$$T = \overline{E^2}\, (\tfrac{1}{4}k\, R_c(Z)\Delta f),$$

where $\Delta f$ is a constant because the measured frequency band is limited by a bandpass filter and $R_c(Z)$ is canceled by the use of a reference signal, $T$ is directly proportional to $\overline{E^2}$.

It is preferred to provide the reference resistance with an adjustable resistor, an adjustable capacitor and an adjustable inductor by means of which the inductance, resistance and inductance of the sensing resistor and its connecting line may be matched. The system has been found to be highly simple, free from breakdown and capable of long-term use with a minimum of repair or supervision.

According to the present invention at least the first switching means (connecting the sensing resistor and the reference resistor via the preamplifier branches with the multiplier) is constituted as a sampling gate having two alternately conducting field-effect transistors (FETs) and provided with a triggering input for the sampling. The output or second switch means, according to the invention, may likewise be constituted as a sampling gate with such field-effect transistors and is synchronized with the first sampling gate by the use of a common trigger for both.

The use of field-effect transistors as switching devices has the significant advantage in that the breakdown rate of the apparatus is substantially reduced and a maximum utilization of the noise voltage of the sensing resistor is obtained. It should be noted that electromechanical switches have a tendency to change operating characteristics with age and are provided with contact resistances which are seltom constant. The resistances constituted by the field-effect transistors are much smaller than the measuring resistances and the reference resistances, thereby increasing the precision of the system.

According to another feature of the invention, each of the preamplifier branches comprises a preamplifier stage connected directly to the output side of the sampling gate and in parallel to one another, and a filter responsive to the selected frequency band of the noise voltage. The filters then feed main amplifiers whose outputs are supplied to the multiplier. For further calibration of the resistance, capacitance and inductance of the reference-resistance range to bring about the matching of these parameters with those of the measuring resistance, there are provided narrow-band amplifiers with a band width within the measurement-frequency range of 500 kHz to 2 MHz, i.e. the narrow-band width of about 20 kHz to 50 kHz, the narrow-band amplifier being switched to shunt the filter and main amplifier of each amplification band by a manually operated pair of interconnected switches. Of course, as described in the patents cited earlier, the resistance, inductance and capacitance of the reference branch and the sensing branch, including the respective parameters of the cables are compared and balanced by a conventional measuring bridge of the wheatstone bridge, capacitance bridge, or inductance bridge type, using alternating-current energization.

While the use of two amplifier-filter paths between the measuring/reference resistors and the multiplier or squaring circuit with commutation of the paths to the resistors and commutation synchronously to the two inputs of the differential amplifier downstream thereof (as described in the aforementioned copending application Ser. No. 238,833), has represented a major improvement in thermal-noise measuring systems over the prior art for the reasons described, the output signal depends upon the adjustment of the variable reference resistor so that its voltage signal is applied to one storage capacitor and the voltage signal from the measuring resistor is applied to the other storage capacitor through its connecting cable whereby the two signals are compared.

It has now been found to be advantageous to arrange the sampling switch at the input to the amplifier paths so that both amplifier paths (each consisting of a preamplifier, filter and main amplifier) are either simultaneously connected with the measuring resistor or with the reference resistor, i.e. both paths are connected alternately to the measuring resistor and the reference resistor via separate cables.

This differs from the parallel connection of the amplifier paths whereby the two amplifier paths were connected in parallel and jointly connected alternately to the measuring resistor or the reference resistor.

The present invention thus makes use of two switch devices (electronic or mechanical) at the input to the amplifier paths, one connectd to each amplifier path. The two switch devices are each adapted to commutate between the measuring resistor and the reference resistor and, of course, the respective cables or leads connecting the resistors to the amplifier and detection circuits.

This has the advantage that the noise signals of the cable resistance, i.e. the effect of the cable resistance upon the desired signal is cancelled out or rendered incapable of detrimentally acting upon the thermal-noise signal from the measuring resistor.

This is important when the measurement site is far from the amplifier path. Also, this arrangement eliminates any noise effect of the ohmic resistance path of the switch when the latter is in a conductive state between the measuring resistor and the respective amplifier path.

It has been found that the two-switch arrangement between the cable and the amplifier paths completely eliminates the superimposition of cable and switch resistance noise upon the ultimate output.

Another important advantage is that it enables the use of the measuring resistor in high radiation fields such as may be encountered in nuclear reactors. In such fields a radiation-induced noise current may arise to affect detrimentally the measurement; the present improvement allows the use of a measuring resistor of small size and low measuring resistance and a connecting cable of small cross-section and relatively long length (as is needed in radioactive installations) because the extraneous noise apart from the measuring noise signal is minimized for the reasons stated.

The noise-voltage temperature sensor comprises, as described in application Ser. No. 238,834, a body of insulating material, preferably an electrically nonconductive ceramic, and a plurality of turns (undulations or loops) of a thin strand of a pure metal or a metal alloy capable of a noise-voltage output in response to variations in temperature, the turns being distributed along the length of the sensor whereby the latter provides a larger output for a given sensor size. The metal strand according to the present invention has a cross section corresponding to a circular area with a diameter between 5 $\mu$ and 50 $\mu$ and preferably has a thickness within this range. Suitable metals include pure metals such as tungsten, tantalum, molybdenum, niobium, titanium, zirconium, platinum; alloys of chromium, nickel and iron, preferably with the aforementioned metals, are also effective.

The strand is, over the length of the elongated sensor, provided with a number of turns in a spiral coil or meander configuration. It has been found that such systems are able to provide a high output in a small space without any difficulties with respect to elongation of the sensing element with a temperature rise which has been characterized in earlier arrangements.

In accordance with still another feature of the invention the major portion of the length of the strand is received within the outlines of the insulating body which is composed of a ceramic. Advantageously the body consists of alumina ($Al_2O_3$), beryllia (BeO), thoria ($ThO_2$), magnesia (MgO) or mixtures thereof sintered or fired into a rigid state. High temperature glasses may also be used.

According to one feature of the invention the ceramic insulating body is formed with a plurality of passages, each of which receives a respective stretch of the metal strand. In another configuration, the metal strand is embodied in a sintered ceramic body, e.g. of alumina, while the preferred case provides the metal strand as a wire, advantage also found it possible to make use of a thin metal film on a carrier of electrically insulating material. In all of the cases described, the temperature sensor is found to have a long useful life and to be easily handled.

DESCRIPTION OF THE DRAWING

The above and other objects, features and advantages of the present invention will become more apparent from the following description, reference being made to the accompanying drawing in which:

FIG. 1 is a circuit diagram illustrating the invention;

FIG. 2 is a schematic of a sampling gate adapted to be used with the system of FIG. 1;

SPECIFIC DESCRIPTION

Figure 3:
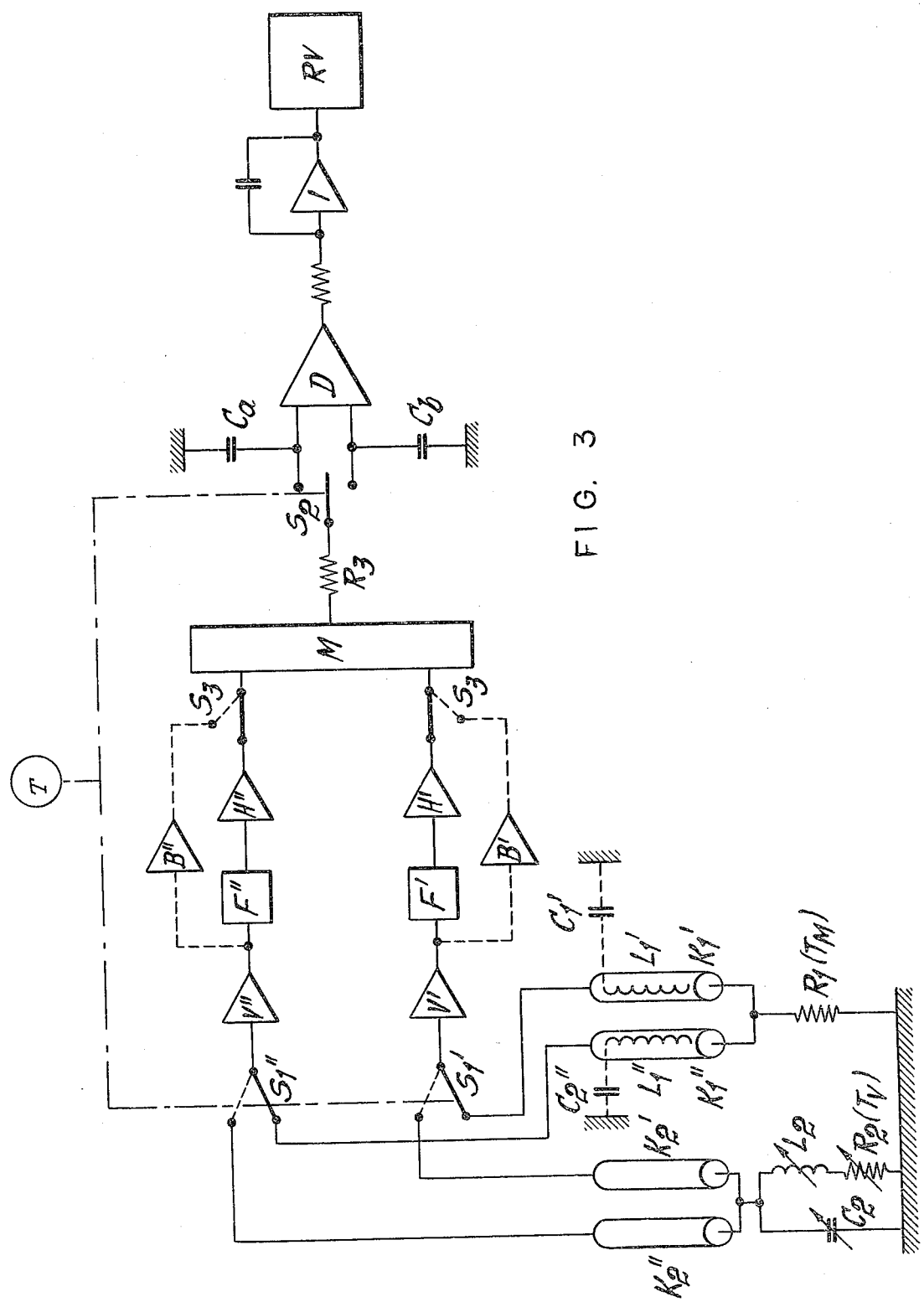
FIG. 3 is a circuit diagram illustrating an improvement over the system of FIG.
Figure 4:
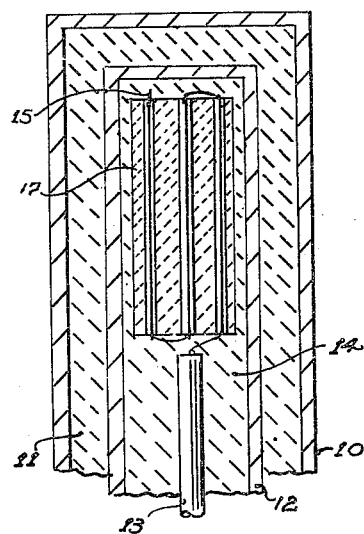
FIG. 4 is an axial cross-sectional view, partly in diagrammatic form, of a temperature sensor for use with the system of the present invention.
Figure 5:
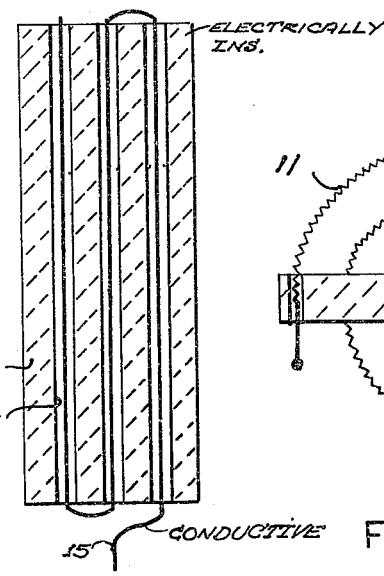
FIG. 5 is an axial cross-sectional view through the ceramic body of FIG. 4.
Figure 6B:
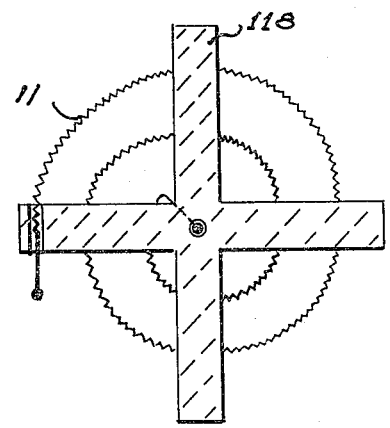
FIG. 6B is a cross-sectional view taken along the line VIB — VIB of FIG. 6A.
Figure 8:
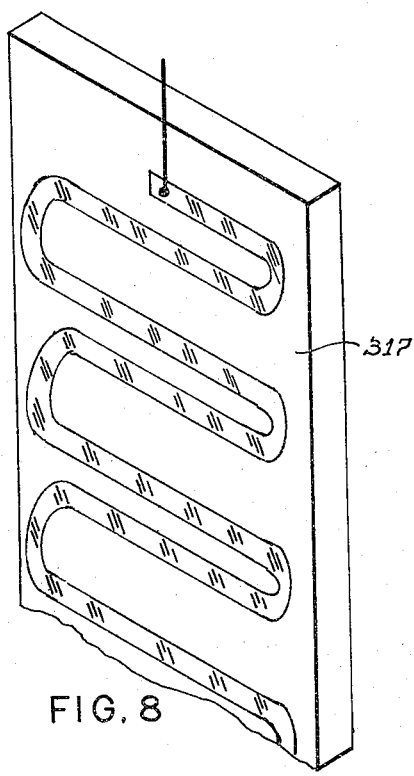
FIG. 8 is a perspective view illustrating a portion of yet another sensing element.
Figure 6A:
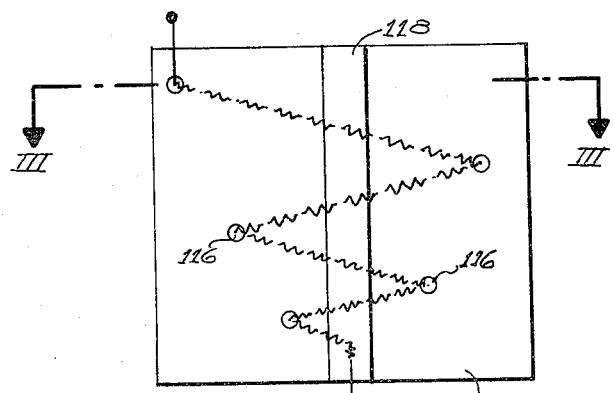
FIG. 6A is an elevational view a sensing element for a temperature-measuring instrument otherwise having the configuration shown in FIG. 4.
Figure 7:
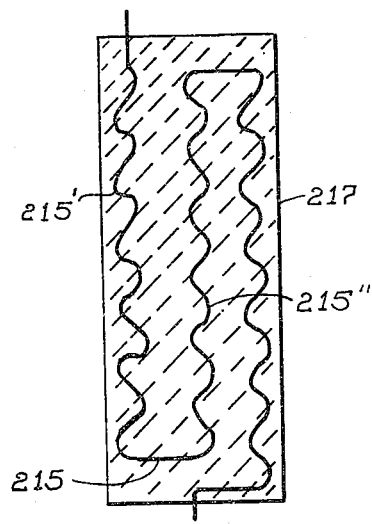
FIG. 7 is an axial cross-sectional view through another sensing element.

In FIG. 1 of the drawing, a temperature-responsive noise-voltage sensor in the form of a resistor $R_1$ subjected to a temperature $T_m$ has been shown in diagrammatic form connected on one side to ground and connected at its other end via a cable or line $K_1$ to one terminal of the first switching means or sampling gate $S_1$. The temperature sensor $R_1$ (whose electrical output may be represented as $R'_1$ subsequently), may be a thin platinum wire as described above but preferably is of the type described in the concurrently filed, commonly assigned copending application Ser. No. 238,834 and entitled TEMPERATURE-MEASURING INSTRUMENT or in connection with FIGS. 4–8. The inductance of the cable $K_1$ (and the sensor $R_1$) is represented at $L_1$ while the intrinsic or line capacitance of the measuring branch is represented at $C_1$.

The reference branch includes a referenced resistance $R_2$ (at temperature $T_v$) connected in series with an adjustable inductor $L_2$ and bridged by a parallel adjustable capacitor $C_2$, the adjustability of the elements $R_2$, $L_2$ and $C_2$ permitting matching of the ohmic, inductive and capacitance impedances of the measuring and reference branches. The reference branch further includes a cable or lead $K_2$ connected to another terminal of the first switching means or sampling gate $S_1$.

As seen in FIG. 2, the sampling gate $S_1$ may comprise a pair of field-effect transistors $FET_1$ and $FET_2$, here shown to be of opposite-conductivity types (n-type and p-type) so as to be energizable by a common trigger T. The field-effect sampling gate may be of the type described at pages 658 ff. of PULSE, DIGITAL AND SWITCHING WAVEFORMS, McGraw-Hill Book Co., New York, 1965. The inputs from the measuring and reference branch $B_1$ and $B_2$ are applied to the drains of the field-effect transistors $FET_1$ and $FET_2$, the commonly connected sources of which feed the preamplifier stages of the amplification networks. It will be apparent that the alternate polarity triggering pulses of the trigger-pulse generator T render the field-effect transistors alternately conductive to apply the measuring branch and the reference branch to the inputs of the respective amplifier chains $V_1$, $F_1$, $H_1$ and $V_2$, $F_2$ and $H_2$ respectively.

The amplifier branches each comprise a preamplifier $V_1$ or $V_2$, a filter $F_1$ or $F_2$ having a pass-band width of the portion of the noise-voltage spectrum which is desired for measurement, and a main amplifier $H_1$ or $H_2$.

The outputs of the main amplifier $H_1$ and $H_2$ are applied to the two inputs of a multiplier/squarer M through a pair of mechanically operated (manual) contacts of a switch $S_3$, the contacts being connected or for joint actuation. The contacts of switch $S_3$ are each of the single pole, double-throw type and can connect, in the alternative, the main amplifier of the respective amplifier branch or a calibration amplifier B to the multiplier.

The multiplied (squared) voltage output $\overline{E}^2$ from multiplier/squarer M is applied through resistor $R_3$ and a commutating switch $S_2$ to the signal-storage capacitors $C_a$ and $C_b$. The sampling switch $S_1$ and the commutating switch $S_2$ (which may be constituted by a pair of field-effect transistors as described in connection with FIG. 2 but connected inversely) are synchronized, e.g. via the common trigger-pulse generator T, so that the noise voltage signal attributed to the measurement branch $B_1$ is always applied to the capacitor $C_a$ while the multiplier signal attributable to the branch $B_2$ is always applied to capacitor $C_b$.

To increase the measuring precision, the capacitors are connected to respective inputs of a differential amplifier D which, in turn, feeds an integrating amplifier I through a resistor $R_4$. The output of the integrator/inverter R is applied to a readout or recording device represented at RV. The latter device may be a pen recorder, a dial or other conventional readout apparatus. With the switches $S_1$ and $S_3$ in the position shown in FIG. 1, the measuring signal from branch $B_1$ and the reference output of branch $B_2$ are applied alternately to both amplifier chains $V_1, \ldots, V_2, \ldots$ and thus to the multiplier/squarer M by which in connection with $R_3$ and $C_a$, $C_b$ the intrinsic amplifier noise and like spurious signals are eliminated so that the output of multiplier/squarer M on $C_a$ or $C_b$ represents the noise voltage only. From time to time, or at the commencement of operation, the inductivity and the capacity of the connecting cable of branch $B_1$ may be minimized by manually operating switch $S_3$ to apply the narrow-band amplifiers to the circuits and adjusting the capacity of condenser $C_2$ and the inductivity of inductance $L_2$ for balance. The temperature, of course, can be given by the relationship $$T_m \approx \frac{R_2 T_v}{R_1}$$

where $T_m$ is the temperature of the measuring resistor $R_1$, $T_v$ is the temperature of the reference resistor $R_2$; when L and C balance is achieved and when the relation $R_1 \cdot T_m = R_2 \cdot T_v$ is fulfilled by variation of $R_2$ then the temperature $T_m$ is given by the aforementioned relationship.

FIG. 1 also shows a set of switches SW adapted to be manually operated to connect the measuring branch $B_1$ and the reference branch $B_2$ in a balancing bridge circuit with a galvanometer G and a supply-current source G' for the setting of the variable capacitor $C_2$, the inductor $L_2$ etc. in the event the amplifiers B are not to be used.

In the modification illustrated in FIG. 3, in which similar reference characters are used to designate structure having counterparts in the system of FIG. 1 and in which the balancing bridge, alternating-current supply therefor and the switches for connecting the balancing bridge across the measuring and reference resistors, have not been shown but are understood to be identical to those of the system used in FIG. 1.

The embodiment of FIG. 3 comprises a temperature-measuring resistor $R_1$, which may be of the type described in connection with FIGS. 4 through 8 or in the cited prior art, connected by cables $K_1'$ and $K_1''$ each having an inductivity contribution as represented at $L_1'$ and $L_1''$ and a capacitance $C_1'$ and $C_2'$. The cables extend to the lower terminal of switches $S_1'$ and $S_1''$, here represented as a single-pole, double-throw switches which are ganged and are connected to respective amplifier paths. Thus the switch $S_1'$ is connected at the input of a preamplifier V' and in turn has its output connected to a bandpass filter F' ahead of a main amplifier H'.

Simultaneously, the switch $S_1''$ is provided at the input to a preamplifier V'' feeding filter F'' at the input side of a main amplifier H'', respectively.

The reference resistor $R_2$ is connected by two cables $K_2'$ and $K_2''$ with the upper contacts or poles of the switches $S_1'$ and $S_1''$.

The switches $S_1'$ and $S_1''$ may each be a single-pole double-throw mechanical switch, operated by electrical means (e.g. a solenoid), a single-pole double-throw contact of a relay having a coil actuating the switches simultaneously, or an electronic switch arrangement, preferably of the type illustrated in FIG. 2 using two field-effect transistors (FETs).

In the latter case, one cable from each of the measuring and reference resistors will be applied to the input terminal of the FET switch while the output terminal thereof is connected to only one of the preamplifiers V' or V'' instead of being branched to the two in parallel.

If the switch of FIG. 2 is employed, therefore, the cable $K_1'$ is connected to the input $B_1$ of one of the two FET switches while the cable $K_2'$ is connected to the other input $B_2$ thereof. The output of this switch is applied to the preamplifier V'. Correspondingly, the cable $K_1''$ is connected to the input $B_1$ of the other FET switch while the cable $K_2''$ is connected to the input $B_2$, and the output of this latter switch is applied to the preamplifier V''.

With this circuit, either the measuring resistor $R_1$ or the reference resistor $R_2$ is applied over both amplifier paths to the multiplier/squarer M, the remaining circuitry being similar to that in FIG. 1.

The reference resistor $R_2$ is provided, as described in connection with FIG. 1 and shown in FIG. 3, with a variable inductor $L_2$ and variable capacitor $C_2$ and is also itself formed as a variable resistance or potentiometer to balance the inductance, capacitance and resistance of the reference branches with the measuring branches.

As previously described, each of the amplifier paths V'—F'—H' is connected by a respective mechanical switch $S_3$ to the multiplier/squarer M, the switches $S_3$ being ganged for joint operation.

Previously it was pointed out that the absolute temperature T is proportional to the value of $\overline{E}^2$. The signal arriving from each of the amplifier paths can be represented as KE where E is the detected signal from the measuring or reference resistor over the bandwidth $\Delta f$ defined by the filter F' and F'', and K is the overall gain of the amplifier path. E is, of course, an alternating-current signal and is a function of time so that the instantaneous value thereof is applied to the multiplier or squaring circuit M in which the signal E is multiplied by itself so that the product at the output of the multiplier is the substantially d-c signal $K^2 E^2$. Since $K^2$ is a constant it may be disregarded for the present purpose.

The output of the multiplier is then fed via a resistor $R_3$ and a switch $S_2$ alternately to the storage capacitors $C_a$ and $C_b$, respectively, at the inputs to the differential amplifier D. The switches $S_1'$, $S_1''$ are ganged as represented in FIG. 3 and are jointly synchronized with switch $S_2$ by a clock pulse generator or other timer T as previously described. As a result, the thermal-noise signal $E_1^2$ from the measuring resistor $R_1$ (processed through the amplifier and multiplier/squarer systems) is applied to the capacitor $C_a$ while the reference signal $E_2^2$, simultaneously processed, is applied to the capacitor $C_b$. Since the capacitors collect the voltage they function as averagers so that the mean value $\overline{E}^2_1$ and $\overline{E}^2_2$ of each signal is applied to the differential amplifier whose output is supplied via the integrator I to the recording device RV.

To minimize perturbations of the thermal-noise signal caused by variations in inductivity and the capacitance of the connecting cables $K_1'$, $K_1''$, provided between the measuring resistor $R_1$ and the amplifier paths $V'$—$F'$—$H'$ and $V''$—$F''$—$H''$, each amplifier path is provided with a narrow-band amplifier $B'$, $B''$ which can be connected to the multiplier/squarer M by the switches $S_3$ in the other positions thereof to allow balancing via capacitor $C_2$ and inductor $L_2$. The frequency range of the narrow-band amplifier should be within the main amplifier range of 500 kHz to 2MHz.

As described for the system of FIGS. 1 and 2, the temperature $T_m$ will be determined from the relation:

$$T_m = \frac{\overline{E_1}^2}{\overline{E_2}^2} \cdot T_v$$

where the fraction $\overline{E}^2_1/\overline{E}^2_2$ is formed between differential amplifiers and $T_m$ is the temperature at the measuring resistance while $T_v$ is the temperature at the reference resistor.

What is claimed is:

1. A system for the measurement of temperature, comprising:
   a measuring branch having a measuring resistor adapted to generate a thermal-noise signal proportional to absolute measure temperature and at least one cable in series with said measuring resistor;
   a reference branch including a reference resistor at a reference temperature and at least one cable in series therewith;
   a pair of amplifier paths each comprising a preamplifier, a filter connected to the output of the respective preamplifier, and a main amplifier energized through the respective filter;
   switch means for alternately connecting said branches to said amplifier paths so that both amplifier paths are simultaneously connected in one switch condition with one branch and in another switch condition with the other branch;
   a multiplier circuit receiving inputs from the main amplifier of both said amplifier paths for producing an output representing the product of the signals applied thereto;
   a differential amplifier having a pair of inputs each connected to a respective storage capacitor;
   a commutating switch synchronized with said switch means for applying the output of said multiplier corresponding to connection of one of said branches to both said amplifier paths to one of said capacitors in one such condition and the output of said multiplier corresponding to connection of the other of said branches to both said amplifier paths to the other capacitor in said other switch condition;
   an integrator receiving an output from said differential amplifier; and
   read out means connected to said integrator for registering the temperature at said measuring resistor, said switch means including two single-pole double-throw switches having respective output contacts connected to the preamplifier of each of said amplifier paths, said measuring branch comprising a first cable connected to one input contact of one of said single-pole double-throw switches and a second cable connected to the corresponding input of the other single-pole double-throw switches, said reference branch having a first cable connected to the other input contact of said one of said single-pole double-throw switches and a second cable connected to the other input contact of the other single-pole double-throw switch, said single-pole double-throw switches being ganged for joint operation.

2. The system defined in claim 1 further comprising a respective narrow-band amplifier connectible between the output of the preamplifier of each amplifier path and said multiplier, said reference branch including a variable capacitor, a variable inductor and a variable resistance enabling balancing of said branches.

3. The system defined in claim 1 wherein said measuring resistor is disposed in the radiation field of a nuclear reactor.

4. The system defined in claim 1 wherein said measuring resistor includes an elongated housing, a thermal-noise-generating strand composed of a metal from the group which consists of tungsten, tantalum, molybdenum, nioblum, titanium, zirconium, chromium, nickel and iron, and alloys of chromium, nickel and iron, wound in a plurality of turns along the length of said housing, a body of electrically insulating ceramic material separating said turns from one another and composed of at least ceramic from the group which consists of alumina, beryllia, thoria and magnesia, and conductors extending into said housing and connecting said strand to the cable of said measuring branch.

5. The system defined in claim 4 wherein said strand has a cross-section corresponding to a circle with a diameter between 5 and 50 microns.

6. The system defined in claim 5 wherein said body is provided with a multiplicity of passages, said strand passing through said passages in alternately opposite directions.

7. The system defined in claim 6 wherein said switch means includes at least one pair of field-effect transistors.

* * * * *